July 2, 1957
B. L. BLUBAUGH
2,797,928
DRIVE-ON LIFT TRAILER
Filed Nov. 25, 1955
5 Sheets-Sheet 1
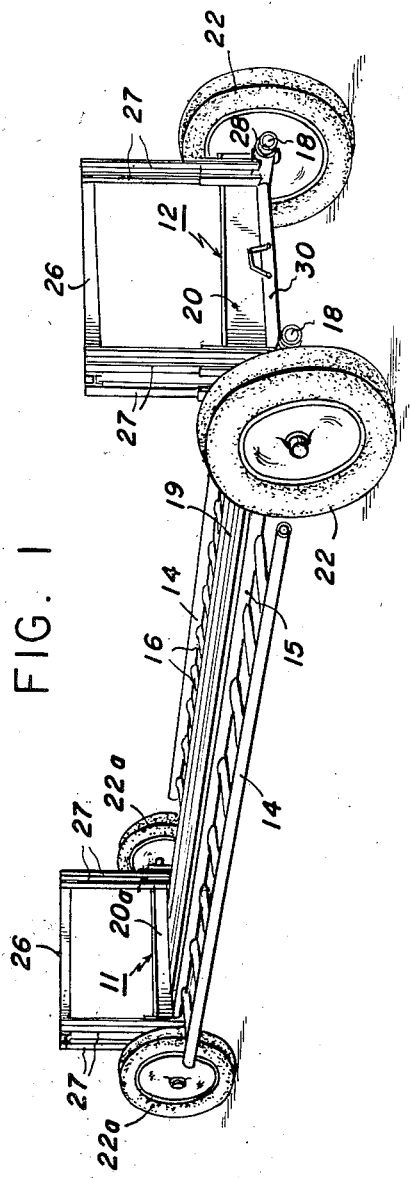
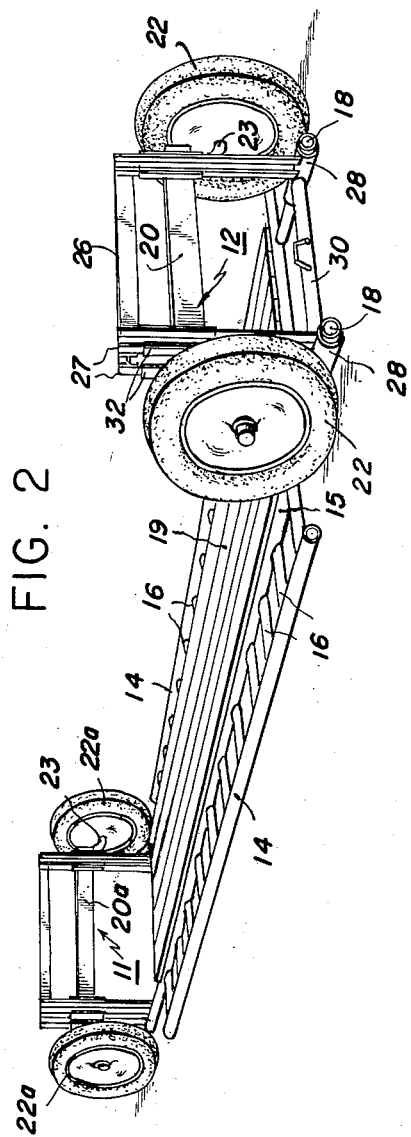
INVENTOR
BERNARD L. BLUBAUGH
BY
ATTORNEYS

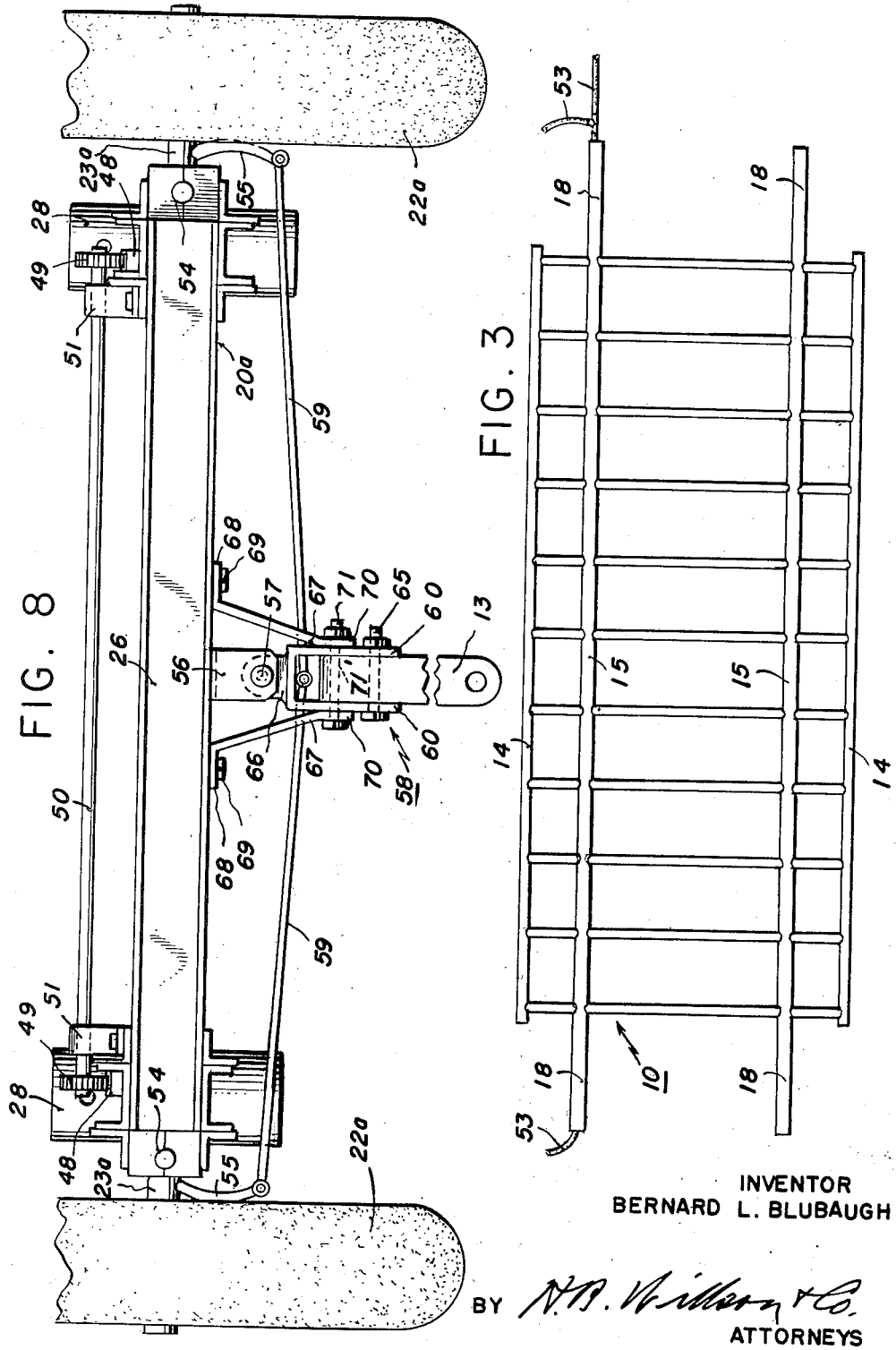

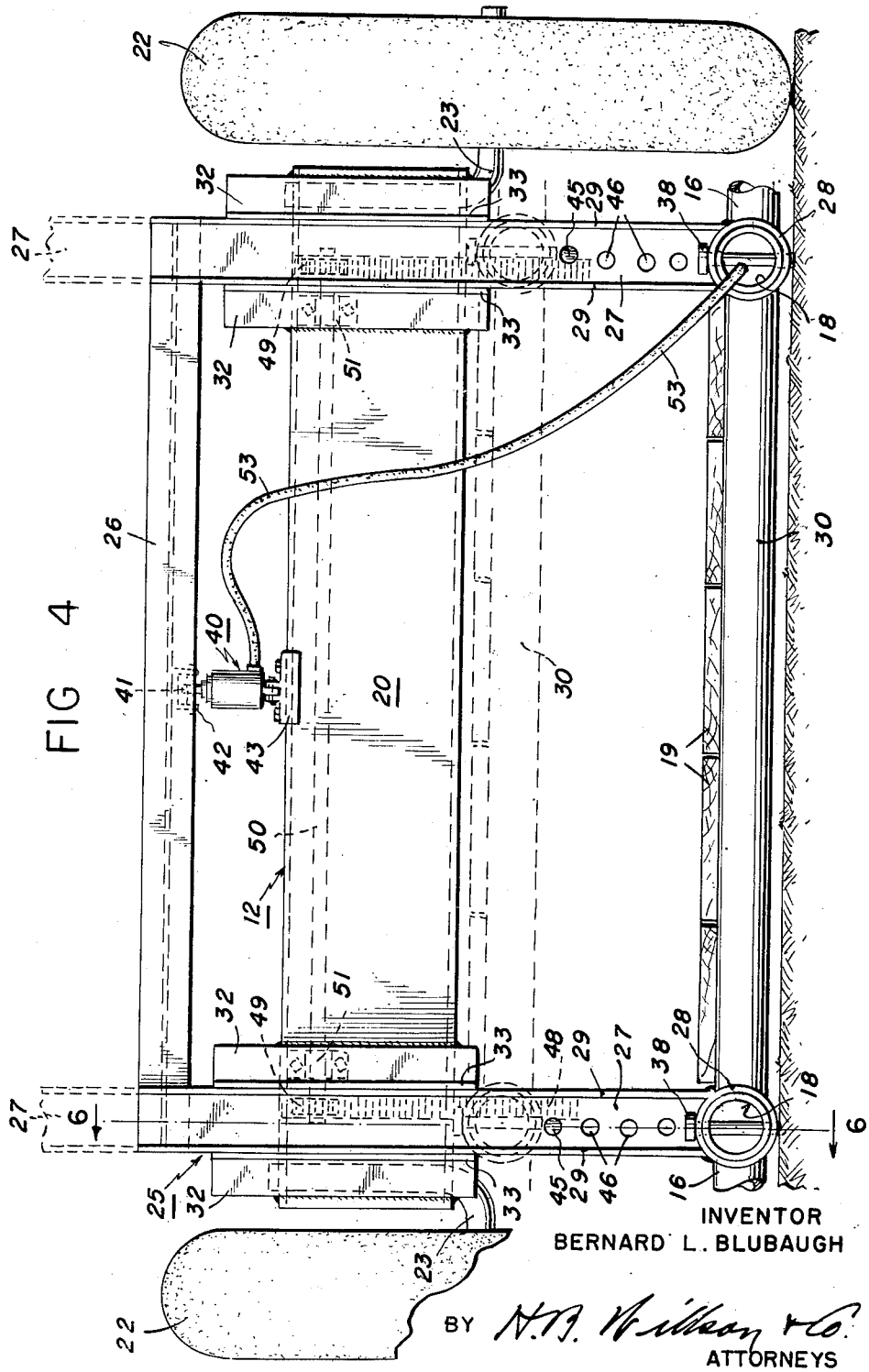

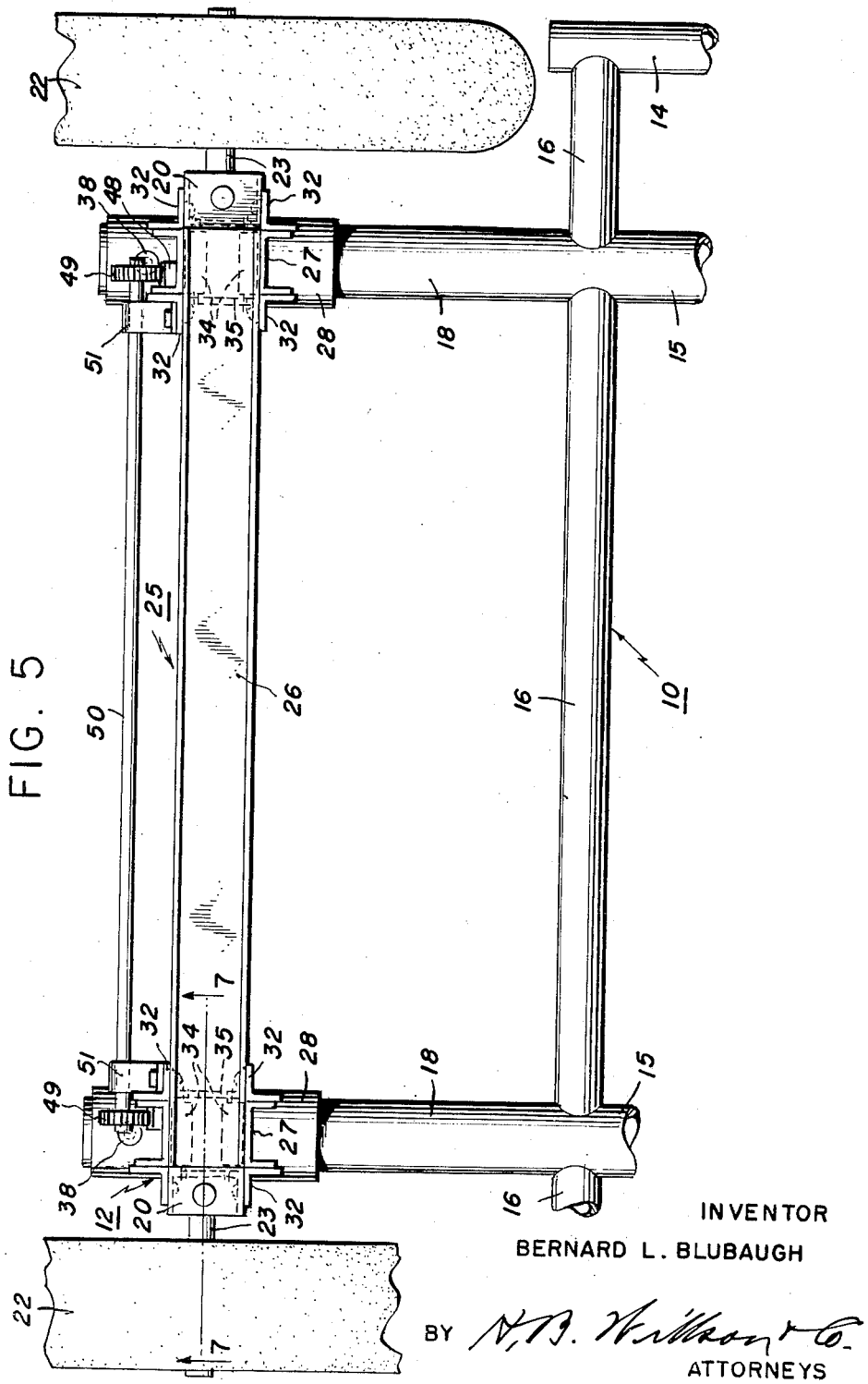

July 2, 1957
B. L. BLUBAUGH
2,797,928
DRIVE-ON LIFT TRAILER
Filed Nov. 25, 1955
5 Sheets-Sheet 5
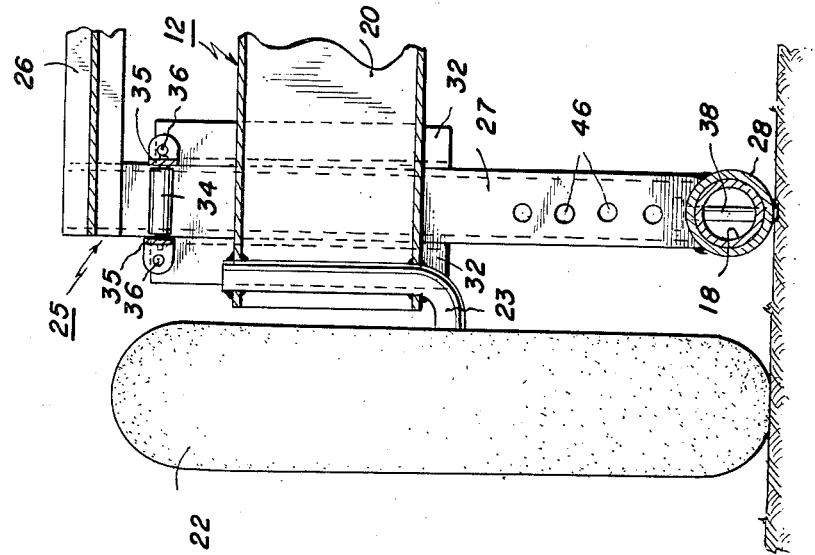
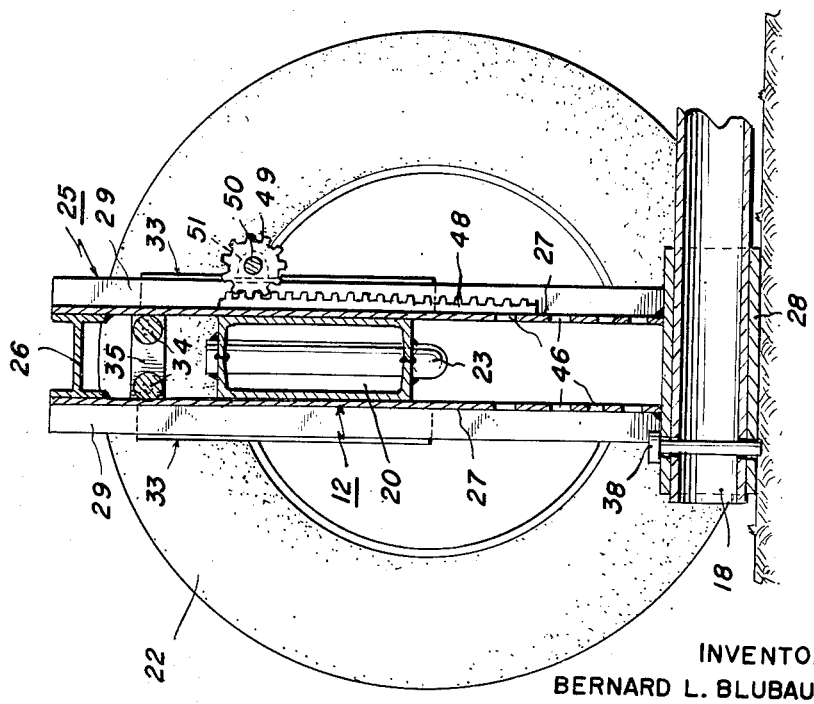
INVENTOR
BERNARD L. BLUBAUGH
BY *H. B. Willson & Co.*
ATTORNEYS United States Patent Office 2,797,928
Patented July 2, 1957

2,797,928
DRIVE-ON LIFT TRAILER
Bernard L. Blubaugh, Medford, Okla.
Application November 25, 1955, Serial No. 548,884
7 Claims. (Cl. 280—44)

This invention relates to transport trucks and trailers that have load carrying bodies capable of being raised and lowered; and it relates more particularly to a four wheel trailer with a body which may be lowered to the ground so that a heavy road or agricultural machine may be driven directly upon it or may be pulled or pushed upon it, the body being then raised to transport position.

While the invention has many uses for transporting heavy loads, it is especially useful as an implement transporting trailer where narrow roads, gates, bridges, etc., are not suitable for wide implements and where the implements may cause road damage or be damaged by being driven over hard roads, since farm machinery or the like may be driven, pulled or backed onto the body platform with ease at ground level.

The invention contemplates a substantially flat and elongated platform, which forms the load supporting body, and front and rear axle and wheel assemblies with means for supporting and vertically adjusting the platform, the assemblies being preferably readily attachable to and detachable from the end portions of the platform so that when the latter rests upon the ground the load may be moved upon it from either side or either end or the platform may be moved under a load such as a small building, a large tank or other heavy or bulky objects, and the axle and wheel assemblies then applied to the platform to elevate it to a transport position.

An object of the invention is to provide an improved four wheel drive-on lift trailer which is very simple in design so that it may be manufactured at small cost as compared to prior lift trailers.

Another object is the provision, in a trailer of this character, of improved platform supporting and adjusting means which may be operated by different types of mechanical or hydraulic jacks so that either end of the platform may be raised or lowered independent of the other end, and no special skill on the part of the operator is necessary.

Another object is the provision, in a trailer of the character described, of a detachable end support for the body platform comprising an axle with supporting wheels, an upright frame with side members vertically guided on the axle and with a cross member at its top and telescopic members at its bottom to coact with telescopic members at an end of the platform, the frame being adjustable by means of a suitable jack disposed between the axle and the cross member, or between the bottom of the frame and the ground.

Another object is to provide a trailer platform end support of the above indicated character that is of simple, strong and durable construction and that may be readily used by unskilled labor for many practical purposes.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:
Fig. 1 is a perspective view of the trailer showing the platform in an elevated position;
Fig. 2 is a similar view showing the platform lowered to the ground;
Fig. 3 is a detail plan view of the body platform;
Fig. 4 is a rear elevation of the rear detachable supporting means for the platform;
Fig. 5 is a top plan view of the parts shown in Fig. 4;
Fig. 6 is a detail vertical section on line 6—6 in Fig. 4;
Fig. 7 is a detail vertical section taken substantially on the line 7—7 in Fig. 5;
Fig. 8 is a detail top plan view of the front detachable supporting means for the platform showing a draft pole or tongue by which the trailer may be pulled, and which is adapted to angle the wheels of the front support for steering.

Referring more in detail to the drawings, the numeral 10 denotes a flat elongated platform which forms the load supporting body of the vehicle, 11 and 12 denote front and rear wheeled assemblies for supporting and adjusting the body platform, these assemblies or units being preferably of the same construction although the front assembly carries a draft tongue or pole 13 and has its ground wheels mounted for steering the trailer or the like. The assemblies include means for lowering the platform to the ground, as shown in Fig. 2, so that the load may be moved onto it from either side, and either or both of the assemblies may have a quickly detachable connection to the platform so that when at least one of the assemblies is removed, the free end of the platform may be pushed or pulled under a load such as a house, a large tank, or the like which cannot readily be moved upon the platform.

While the platform 10 may be variously constructed, it is preferably made of welded sections of metal tubes or pipes and may include outer side sections 14 and longer and parallel intermediate sections 15 connected by smaller cross pipe sections 16. The ends of the longitudinal sections 15 project beyond the outer or endmost sections 16 to provide at the ends of the platform laterally spaced longitudinally projecting arms 18. Longitudinally extending planks 19 may be mounted on the cross sections 16 if a solid or continuous surface is desired for the platform top.

The rear assembly 12 comprises an axle 20 preferably formed by two channel metal bars welded together with their channels facing to provide a heavy rectangular beam. At each end of the axle beam is a suitable ground wheel 22 mounted on a spindle at one end of a right angular member 23, the other end of which projects upwardly through the beam 20 and is welded therein. Mounted on the axle beam and straddling it longitudinally is an upright frame 25 which is vertically adjustable and to the lower part of which one end of the platform is suitably connected. This frame comprises a top bar 26, preferably a metal I beam, pairs of spaced upright side bars 27 disposed adjacent the ends of the axle, the bars of the pairs being spaced to receive the axle beam between them, and a pair of forwardly and rearwardly extending tubular members 28 disposed beneath the axle beam and connecting the spaced lower ends of the side bars 27. The latter are preferably channel metal bars which have their upper ends welded to the top bar 26 and their lower ends welded to the tubes 28 at spaced points. The U-shaped or channel bars 27 have their web portions disposed close to the flat side faces of the axle beam and their flanges 29 projecting outwardly. The parallel tubes 28 are preferably connected by a metal bar or pipe 30 welded midway of their ends to provide the frame with a lower bar disposed beneath the longitudinal axis of the axle. The frame 25 is guided by pairs of upright guide bars 32 welded to the opposite sides of the axle beam adjacent each end of the latter. These guide bars are preferably angle metal bars with the flanges 33 projecting outwardly, the flanges of each pair being spaced to slidably receive between them one of the channeled side bars 27. The major portions of the guide bars 32 project above the axle but their lower ends extend below the axle bottom and receive between them the lower bar 30 when the frame is in its elevated position. To reduce friction anti-friction rollers 34 may be disposed to engage the web portions of the channeled side bars 27. These rollers are mounted between opposed pairs of bracket plates or straps 35 with bent ends secured by bolts or other fastening means 36 to flanges of the forwardly and rearwardly opposed angle metal guide bars 32.

The quick attachable and detachable connection between the frame 25 and an end of the platform 10 may be made by telescoping the tubes 28 over the arms 18. These parts 18 and 28 form coacting telescopic elements which may be variously shaped and constructed. When they are engaged, pins 38 may be inserted in an opening, formed adjacent the ends of the arms 18, after the ends have been extended entirely through the tubes.

The frame 25 may be moved by various forms of mechanical or hydraulic jacks interposed between the midpoints of the axle beam and the top bar 26, or a jack resting on the ground may operate against the central portion of said bar 30 which may carry a bracket plate to be engaged by the movable member of the jack. As shown in Fig. 4, a removable hydraulic jack 40 of any suitable form may have its piston rod pivoted at 41 to a U-shaped bracket 42 fastened to the top bar 26 and its base portion supported on a bracket plate 43 fastened to the axle beam; or a permanently mounted jack may be fastened between the centers of the parts 20 and 26. The jack will be of a type to either raise or lower the frame which may be held at any desired height relative to the axle by inserting removable pins 45 in any holes of a vertical series of holes 46 formed in side bars 27, the protruding ends of the pins resting on the top of the axle beam to support the frame. Since the jack is positioned at the center of the frame, any binding of its side bars in the guide bars 32 may be prevented by providing on the side bars 27 upright racks 48 which mesh with pinions 49 fixed at the ends of a torsion shaft 50 so that both sides or ends of the frame will have the same degree of movement. The rack bars 48 may be fixed to the web portions of the side bars at the rear or exposed side of the assembly and the shaft 50 may be mounted in bearing 51 suitably supported from the axle, as by mounting them on flanges of the angle metal guide bars 32. When a hydraulic jack is used its operating fluid may be supplied from the hydraulic system of the tractor which is used to pull the trailer. A fluid line or lines 53 is shown in Figs. 3 and 4 as extending from the cylinder of the jack and through one of the tubes 15 of the platform to the forward portion of the trailer where it may be connected to the tractor hydraulic system.

With certain exceptions the construction and operation of the illustrated front assembly 11 is the same as that of the above described rear assembly 12, and in the following description of the front assembly the corresponding parts will bear the same numerals wtih exponents. The front axle 20ª has its wheels 22ª mounted on spindle members 23ª which may swing about vertical pivots 54 and carry actuating arms 55. The front axle beam 20ª has fastened to the center of its front face a U-shaped bracket 56 carrying a vertical pivot 57. Mounted on that pivot is a forwardly projecting connecting member 58 which carries the draft tongue 13 and which is connected by links 59 to the spindle arms 55 so that the trailer may be steered by horizontally swinging the tongue on the pivot 57. To permit the tongue to have a limited vertical swinging movement, the rectangular rear end of the tongue is disposed between upright plates 60 on the forward end of the member 58 and is mounted forwardly of its rear end on a horizontal pivot 65 in the plates 60. The latter may be channel irons welded to a sleeve-like member 66 which is disposed in the bracket 56 and is apertured to receive the pivot pin 57. Under some conditions of use of the trailer, it is desirable to lock the tongue against movement relative to the axle so that the wheels 22ª will not be steerable. That may be accomplished by providing on one or both sides of the connecting member 58 an angular metal bar 67 with a rear arm 63 adapted to be fixed to the axle beam 20ª by a bolt 69 passing through the latter. The forward end 70 of the member or bar 67 is disposed in the channel of the adjacent plate 60 and is fastened therein by a transverse bolt 71 which passes through the web portions of both of the channel plates 60 as well as through a transverse opening 71' in the tongue 13 in rear of the pivot pin 65. Thus the tongue will be prevented from swinging vertically on the pivot 65 and the connecting member will be prevented from swinging horizontally on the pivot 57.

It is believed the operation and uses of the invention will be understood from the foregoing detailed description of the present preferred embodiment of the invention. It will also be apparent that this four wheel drive-on lift trailer is of extremely simple, strong and durable construction and may be manufactured at a relatively small cost. Since the grid-like platform is made of metal tubes it will be so thin that when it is on the ground, a tractor may be driven across it to pull a wide disk harrow or the like upon the central portion of the platform so that the machine extends lengthwise of the latter. When at least one of the wheeled assemblies is removed, the free end of the platform may be pushed or pulled under a heavy load which cannot be readily moved. Any kind of mechanical or hydraulic jacks may be used and no special skill on the part of the user will be required. The platform may be used as a sled on the ground. Time and effort can be saved by hauling water or feed to livestock at a distant part of the farm, the platform being then lowered so that farm animals may consume the provisions without unloading the trailer.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A trailer comprising a flat, elongated platform, supporting means at each end of the platform including a wheel supported axle and an upright adjustable frame vertically slidable on the axle and having a cross member disposed over the axle, whereby a jack may be interposed between it and the axle to move the frame to an adjusted position, readily detachable connections between the lower portions of the frames and the ends of the platform, and means holding said frames in adjusted positions on the respective axles, each of said axles carrying laterally spaced upright guides, each of said frames including side bars slidable in the associated guides and having their upper ends connected by one of said cross members, and each of said readily detachable connections comprises pairs of spaced detachably engaged telescopic elements, certain of the latter being carried by the lower portion of the frame and the coacting elements being carried by the associated end of the platform.

2. The structure of claim 1 in which each of said means holding said frames in adjusted positions comprises longitudinal series of holes in said side bars and pins removably engaged with the holes and supported on the associated axle.

3. In a trailer, a flat elongated platform and detachable means for adjustably supporting one end of the platform, said means comprising a pair of laterally spaced horizontal arms which project from said one end of the platform, a rectangular beam forming an axle and carrying at its ends supporting wheels, an upright frame extending longitudinally of the axle beam and straddling the same, said frame including an upper cross bar, pairs of spaced upright side bars disposed adjacent the ends of said beam and having their upper ends connected by said cross bar, the side bars of each pair being slidable on opposite sides of said beam, and a longitudinally extending horizontal tube connecting the lower ends of each pair of side bars and removably telescoped over one of the said arms of the platform, opposed pairs of upright guide bars adjacent each end of said beam, said guide bars being fixed to the opposite side faces of said beam with the bars of each pair spaced laterally to receive between them one of said frame side bars to guide the same, jack means to move said frame relative to said beam, and means holding said frame in an adjusted position.

4. The structure of claim 3 in which said jack means is disposed between said beam and said top cross bar substantially midway of said beam, together with means preventing binding of the frame side bars in said guide bars when the frame is adjusted, said last mentioned means comprising upright rack bars on said side bars, a horizontal torsion shaft rotatably mounted in fixed bearings supported from said beam and disposed adjacent guide bars at each side of said frame, and pinions fixed to said shaft and meshing with said rack bars.

5. The structure of claim 3 in which said guide bars are angle metal bars with flanges projecting outwardly from the side faces of the beam and said side bars are channel metal bars with their web portions disposed against the side faces of the beam and their parallel flanges slidably engaged with said flanges of the angle bars, said angle bars having their major portions projecting above the top of the beam, brackets connecting opposed angle bars on opposite sides of the beam adjacent the tops of the angle bars, said brackets adjacent each end of the beam being in horizontally opposed relation, and anti-friction rollers mounted between the opposed brackets and having rolling contact with the web portions of the associated channeled side bars.

6. The structure of claim 3 in which said frame includes a lower cross bar disposed beneath said beam and having its ends connected to the tubes carried by said side bars, and in which the lower ends of said guide bars extend below the bottom of said beam and receive between them the lower cross bar of the frame when the latter is adjusted to an elevated position.

7. In a trailer of the character set forth, a flat elongated platform, supporting means at at least one end of the platform including a wheel supported axle and an upright adjustable frame vertically slidable on the axle and having a cross member disposed over the axle, whereby a jack may be interposed between it and the axle to move the frame to an adjusted position, readily detachable connections between the lower portions of the frame and the adjacent end of the platform, and means holding said frame in an adjusted position on the said axle, the latter carrying spaced upright guides, said frame including side bars slidable in said guides and having their upper ends connected by the said cross member, and said readily detachable connection comprising pairs of detachably engaged telescopic elements, certain of the latter being carried by the lower portions of the frame and the coacting elements being carried by the associated end of the platform.

References Cited in the file of this patent
UNITED STATES PATENTS

| | | |
|---|---|---|
| 1,310,146 | Schneider | July 15, 1919 |
| 2,415,706 | Ronk | Feb. 11, 1947 |